(12) United States Patent
Gazerro

(10) Patent No.: US 11,509,122 B2
(45) Date of Patent: Nov. 22, 2022

(54) ELECTRICAL INSTALLATION HOUSING

(71) Applicant: Peter Gazerro, Paramount, CA (US)

(72) Inventor: Peter Gazerro, Paramount, CA (US)

( * ) Notice: Subject to any disclaimer, the term of this patent is extended or adjusted under 35 U.S.C. 154(b) by 7 days.

(21) Appl. No.: 17/344,800

(22) Filed: Jun. 10, 2021

(65) Prior Publication Data

US 2022/0239084 A1  Jul. 28, 2022

Related U.S. Application Data

(60) Provisional application No. 63/142,263, filed on Jan. 27, 2021.

(51) Int. Cl.
*H02G 3/08* (2006.01)
*H02G 3/12* (2006.01)

(52) U.S. Cl.
CPC .............. *H02G 3/085* (2013.01); *H02G 3/121* (2013.01)

(58) Field of Classification Search
CPC .......... H02G 3/085; H02G 3/08; H02G 3/086; H02G 3/10; H02G 3/12; H02G 3/121; H02G 3/123; H05K 5/0204; H05K 5/0247
See application file for complete search history.

(56) References Cited

U.S. PATENT DOCUMENTS

| | | | | |
|---|---|---|---|---|
| 1,604,516 A * | 10/1926 | Jacobsen | ............... | H02G 3/086 220/3.92 |
| 4,753,361 A * | 6/1988 | Medlin, Jr. | ............. | H02G 3/125 220/3.9 |
| 4,757,967 A * | 7/1988 | Delmore | ................ | H02G 3/126 248/27.1 |
| 5,448,012 A * | 9/1995 | Jacob | ..................... | H02G 3/085 174/53 |
| 6,951,983 B1 * | 10/2005 | Gretz | ..................... | H02G 3/121 220/3.6 |
| 7,098,399 B1 * | 8/2006 | Gretz | ....................... | H02G 3/12 174/53 |
| 10,888,007 B1 * | 1/2021 | Bahl | ...................... | H02G 3/081 |
| 2004/0045960 A1 * | 3/2004 | Rose | ..................... | H02G 3/126 220/3.9 |
| 2014/0262416 A1 * | 9/2014 | Conway | ................... | H02G 3/16 174/59 |
| 2021/0075203 A1 * | 3/2021 | McDonald | ............ | H02G 3/123 |

* cited by examiner

*Primary Examiner* — Hoa C Nguyen
*Assistant Examiner* — Amol H Patel
(74) *Attorney, Agent, or Firm* — Clement Cheng

(57) ABSTRACT

An electrical installation housing has a top wall, a left side wall, the right side wall, a bottom wall, a rear wall, and a rear beveled wall. A first mounting flange extends from the right side wall. The first mounting flange includes a first mounting flange hole. A second mounting flange extends from the right side wall. The second mounting flange includes a second mounting flange hole. A third mounting flange extends from the left side wall. The third mounting flange includes a third mounting flange hole. A fourth mounting flange extends from the left side wall. The fourth mounting flange includes a fourth mounting flange hole.

9 Claims, 8 Drawing Sheets

ELECTRICAL INSTALLATION HOUSING

This application is a non-provisional of U.S. provisional application 63/142,263 filed Jan. 27, 2021, entitled Electrical Installation Housing, by same inventor Peter Gazerro the disclosure of which is incorporated herein by reference.

FIELD OF THE INVENTION

The present invention is in the field of electrical installation housings.

DISCUSSION OF RELATED ART

Plastic electric boxes commonly known as work boxes are often used in residential construction for providing connections for electrical conduits and apparatus such as switches the like. The plastic electric boxes are typically nailed to a frame structure of the building such as to a wooden stud. In North America, wooden frame studs are typically vertical and set apart at 16 inches on center. Standard plastic electric boxes do not have the flange required to hold the box flush with the wall board. The plastic boxes do not have a knock out required for connecters. The existing boxes lack structure to retain the box from movement in a direction toward and away from the wall.

SUMMARY OF THE INVENTION

The present invention seeks to provide a solution to the box security problem by securing the box against moving in directions toward and away from the wall.

An electrical installation housing has a top wall, a left side wall, the right side wall, a bottom wall, a rear wall, and a rear beveled wall. A first mounting flange extends from the right side wall. The first mounting flange includes a first mounting flange hole. A second mounting flange extends from the right side wall. The second mounting flange includes a second mounting flange hole. A third mounting flange extends from the left side wall. The third mounting flange includes a third mounting flange hole. A fourth mounting flange extends from the left side wall. The fourth mounting flange includes a fourth mounting flange hole.

A first V-shaped slot and is formed on the right side wall. A second V-shaped slot is formed on the right side wall. A third V-shaped slot is formed on the right side wall. A fourth V-shaped slot is formed on the left side wall. A fifth V-shaped slot is formed on the left side wall. A sixth V-shaped slot is formed on the left side wall. A first romex knockout is formed on the rear beveled wall and a second romex knockout is formed on the rear wall. A first fixture mounting hole is formed at a top wall fixture mount and a second fixture mounting hole is formed at a bottom wall fixture mount.

A supplemental bracket holder is formed as a bracket retainer having a bracket retainer left edge and a bracket retainer right edge defining a slot between the bracket retainer left edge and the bracket retainer right edge. A bracket retainer hook is formed on the bracket retainer.

A first channel cut out is formed on the right side wall, and a second channel cut out is formed on the left side wall. The first channel cut out overlaps the second V-shaped slot, and the second channel cut out overlaps the fifth V-shaped slot. A first circular knockout is formed on the rear beveled wall next to the first romex knockout, and a second circular knockout is formed on the rear wall next to the second romex knockout. The third mounting flange has a third mounting flange offset. The third mounting flange and the fourth mounting flange have a narrow flange width of a smaller dimension than a wide flange width of the first mounting flange and the second mounting flange.

Figure 1:
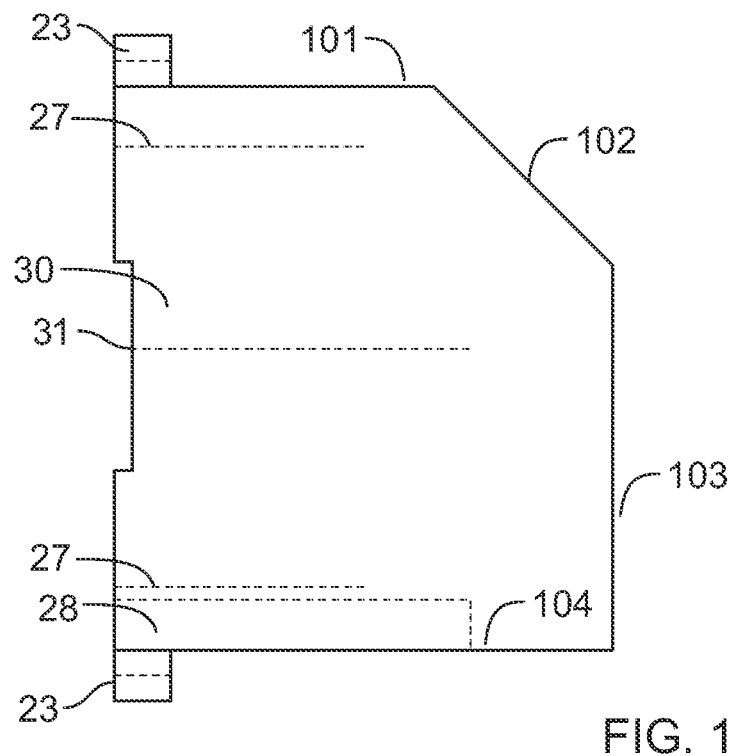
FIG. 1 is a side view of a ceiling mounted cut in electrical box.

The following call out list of elements can be a useful guide in referencing the element numbers of the drawings.
21 device mounting hole
22 romex knock out
23 fixture mounting hole
24 rear panel circular knock out
25 mounting flange
26 flange mounting holes
27 v shaped groove
28 supplemental bracket holder
29 inside hole knockout
30 channeled bar cut out
31 crossover bracket cut out
32 tracing cut out
33 distance between threaded openings (generally 3½")
34 first V-shaped groove
35 second V-shaped groove
36 third V-shaped groove
37 fourth V-shaped groove
38 fifth V-shaped groove
39 sixth V-shaped groove
40 rear panel
41 first rear panel circular knockout
42 second rear panel circular knockout
43 first rear panel romex knockout
44 second rear panel romex knockout
45 first fixture mounting hole
46 second fixture mounting hole
47 front opening
48 wide flange width
49 narrow flange width
50 bracket retainer 51 bracket retainer left edge support
52 bracket retainer slot
53 bracket retainer hook
54 mounting fixture flange
55 6-32 screw hole
56 bracket retainer right edge support
57 bracket retainer hook left slot
58 bracket retainer hook right slot
59 bracket retainer hook indent
61 first mounting flange
62 second mounting flange
63 third mounting flange
64 fourth mounting flange
65 first tracing cut out
66 second tracing cut out
67 fourth tracing cut out
68 third mounting flange offset
69 flange offset
71 first housing corner
72 second housing corner
73 third housing corner
74 fourth housing corner
81 first mounting flange hole
82 second mounting flange hole
86 third mounting flange hole
84 fourth mounting flange hole
101 top wall
102 rear beveled wall
103 a rear wall
104 bottom wall
105 right side wall
106 left side wall

DETAILED DESCRIPTION OF THE PREFERRED EMBODIMENT

As seen in FIG. 1, a housing made of plastic has a top wall 101, a rear beveled wall 102, a rear wall 103, a bottom wall 104, a right side wall 105, and left side wall 106. The rear panel 40 can be formed as a beveled wall 102 meeting a rear wall 103. The beveled wall connects between the top wall, rear wall, left wall, and right wall. A top flange extends from the top wall for receiving a screw receiving hole also called a fixture mounting hole 23. The fixture mounting hole can be a standard 8-32 threaded screw hole having 32 threads per inch.

The measurement between the top hole, #3, and the bottom hole, #3 is 3½". The present invention can be made as a ceiling mounted box or a wall-mounted box. The ceiling mounted box is preferably red colored and called a red box. The wall mounted box is preferably green colored and called a green box. The height of the Red box is taller than the green box. The green box is a standard height wall box. The ceiling boxes for light fixtures that have always been 3" or 4" round or octagon. The ceiling box is similar to the standard wall box. The height of the box and the distance between the #3 holes, is for standard light fixture brackets that mount to the box at a distance of 3½". The red box color allows easy recognition.

A series of parallel V shaped grooves extend along the right side wall and the left side wall of the housing at an upper, middle and lower portion of the housing. The V-shaped grooves preferably have a 45° inside angle and can have an equilateral triangle cross-section. The V-shaped grooves 27 extend from the front opening of the housing and travel towards the rear. The 45° angle is configured to grab onto a tip of a screw so that the screw penetrates the V-shaped groove through the right side wall, or the left side wall and anchors into a structural stud member such as a fire block. The V-shaped groove 27 is preferably approximately half the thickness of the right side wall or left side wall of the housing. The V-shaped groove 27 is preferably formed during plastic injection molding on the inside surface of the housing. The housing forms a hollow with an open front face.

The v shaped groove is also on the bottom and the top of all the boxes. There are two v shaped grooves at the top and two at the bottom. Sometimes the box is sitting on a fire block in the wall. A fire block is generally a wood 2×4 block that runs horizontally between the wood studs. It's installed by code as a fire stop.

The front opening of the housing further includes a crossover bracket cut out and a channeled bar cut out which allow installation of brackets to the housing. The brackets can reinforce the housing. A supplemental bracket holder 28 can be mounted at a lower inside portion of the lower wall or on a lower portion of the left or right side wall. The supplemental bracket holder 28 is preferably formed as a slot or groove on the lower wall. The slot or groove is preferably disposed toward a rear portion of the lower wall. The slot or groove can be open on a left or right side to allow sideways or angled insertion of a bracket in tight quarters.

The two sets of three V-shaped grooves 27 extend along a right and left side of an inside surface of the box for a total of six V-shaped slots 27 along the sides, and V-shaped slots 27 at the top and bottom for a total of 8 slots. The V-shaped grooves can be nominated as an upper right groove, a middle right groove, a lower right groove, an upper left growth, a middle left groove, and a lower left groove.

Figure 2:
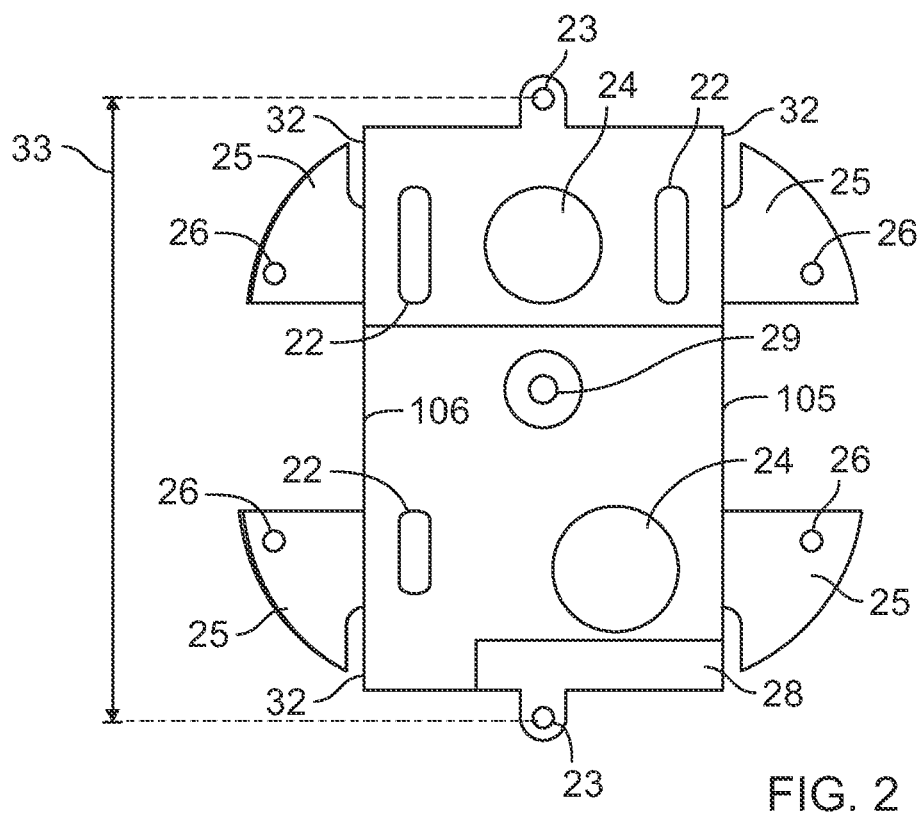
FIG. 2 is a front view of the ceiling mounted cut in electrical box conforming to a rectangular opening.

As seen in FIG. 2, the rear wall, also called rear panel, can have some knockouts such as a rear panel circular knock out 24 formed as a ½" diameter knock out. Also, the rear wall can have a romex knock out 22 formed as a perforated oval or pill shape removable flat portion of the housing. Romex is a type of insulated household electrical cable for carrying household electric current at 120-240V. Also, an inside hole knockout 29 can be formed on the rear wall as a 3/16" hole inside ⅜" knock out. The Romex knock out 22 is formed as a ⅞'" diameter perforated knock out. In electrical terms, it's a ½ inch knock out, but the actual diameter is ⅞". The ⅞' hole fits all ½ inch fittings and pipe. The inside diameter of the ½ inch pipe is ½" and the outside diameter is just under ⅞". Where this far Each of the mounting flanges 25 can be formed as extensions protruding orthogonally from the left and right side walls. Each of the mounting flanges 5 preferably include flange mounting holes 26 for receiving a screw or nail. The flange mounting holes 26 are adapted to receive driven connectors and are 3/16" holes. Each of the flanges 25 preferably include a tracing cut out 32 so that a user can place the front of the housing against a drywall and use a pencil to trace each of the tracing cut out 32 as a guide for preparing drywall for cutting. The drywall when installing a new light fixture, typically the drywall is cut for installing the electrical box.

Figure 3:
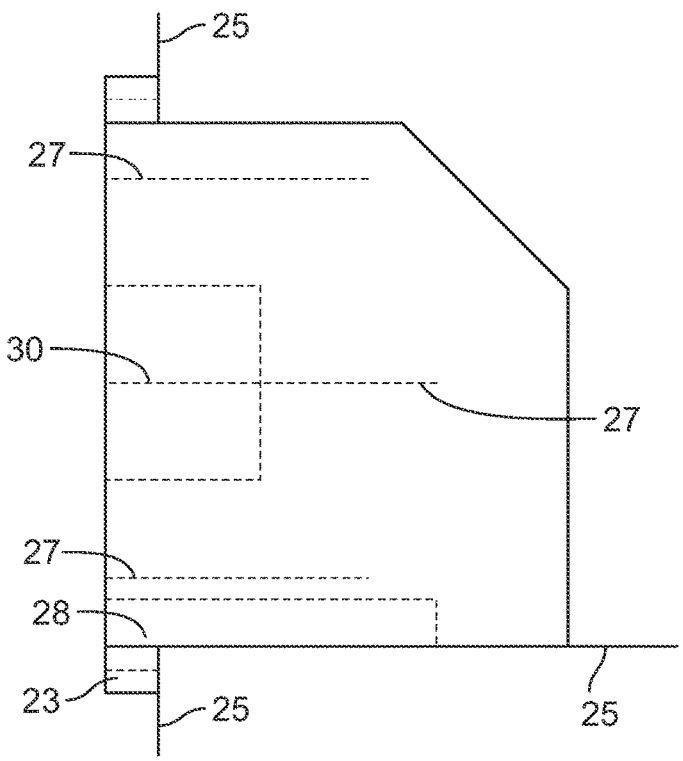
FIG. 3 is a side view of a ceiling mounted rough electrical box.

As seen in FIG. 3, the housing has an extending mounting flange 25 extending upwardly from the upper wall and extending downwardly from the lower wall. The V-shaped grooves 27 extend along a side wall, and the supplemental bracket holder is formed at a base of the housing. An extending mounting flange 25 may extend rearwardly from the lower wall.

Figure 4:
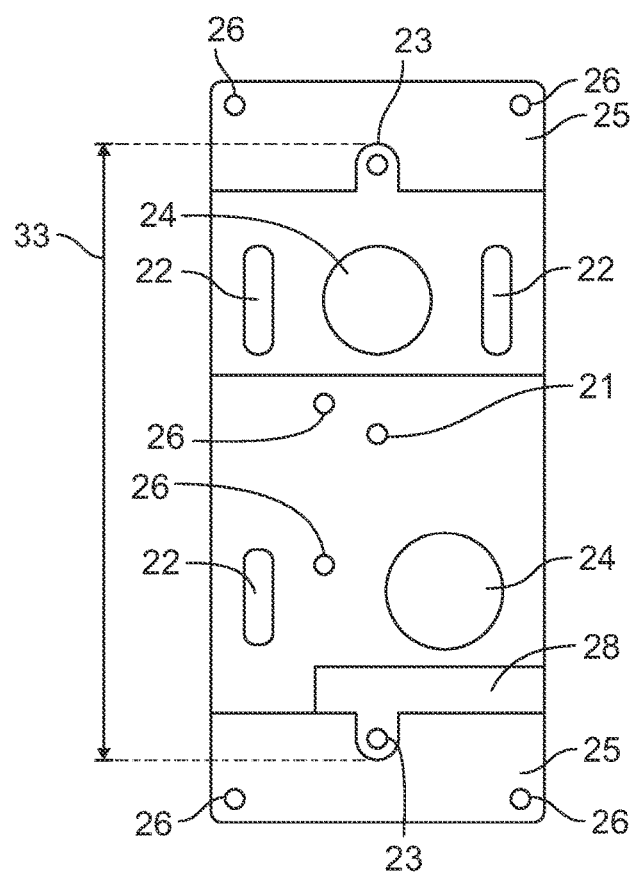
FIG. 4 is a front view of a ceiling mounted rough electrical box.

As seen in FIG. 4, a device mounting hole 11 can be formed as a 6-32 screw hole having 32 threads per inch and is disposed in a middle rear portion of the electrical housing.

Figure 5:
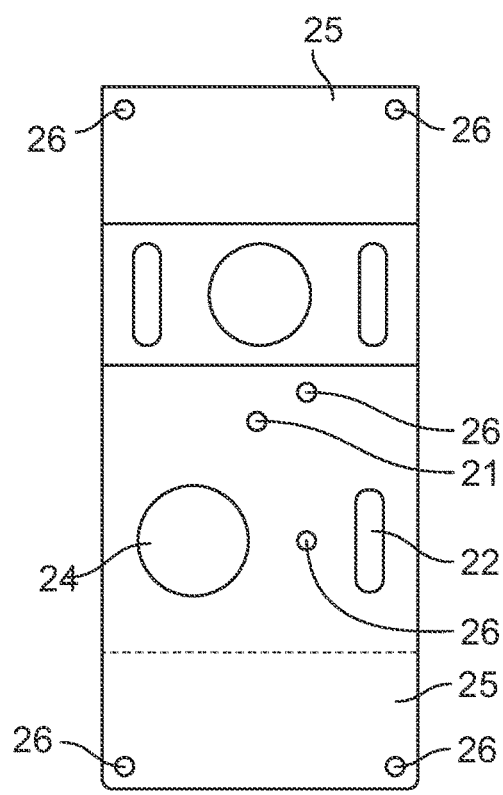
FIG. 5 is a front view of a ceiling mounted rough electrical box.

As seen in FIG. 5, the configuration of the knockouts can be modified for mounting in different locations. For example, the knockouts can be formed on the rear beveled surfaces of the housing and on a rear wall of the housing.

Figure 6:
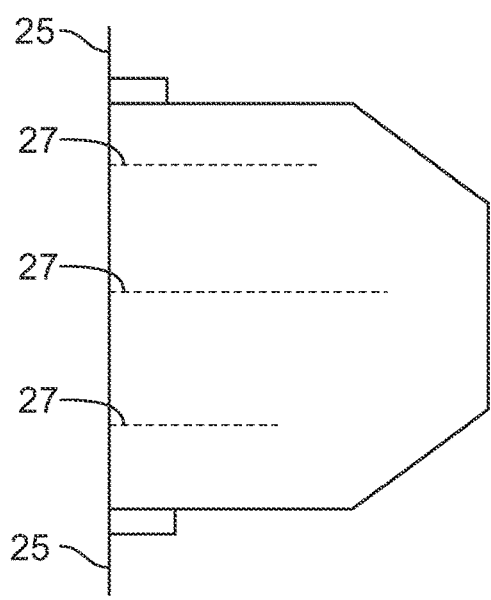
FIG. 6 is a side view of a wall-mounted cut in electrical box.
Figure 7:
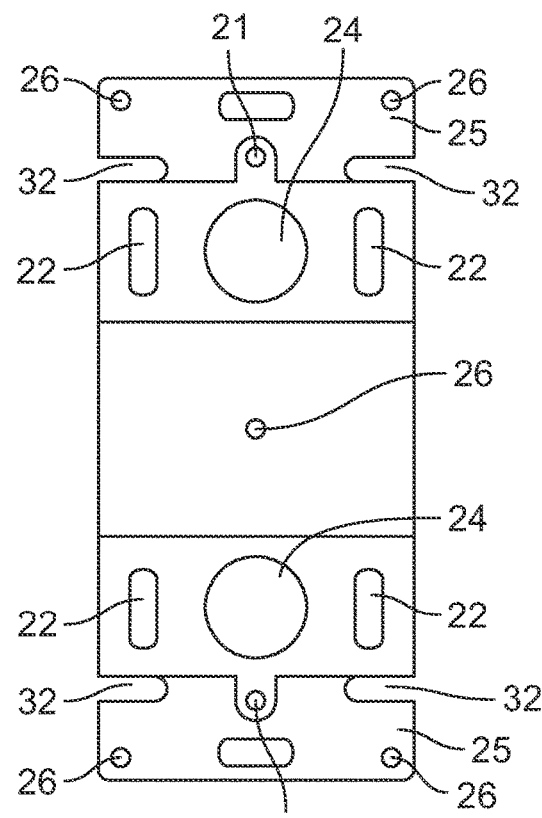
FIG. 7 is a front view of a wall-mounted cut in electrical box.

As seen in FIGS. 6-7, the present invention electrical box can be configured to receive a wall device such as a switch. When configured as a wall mounted box for receiving a device, the cutouts can be moved to an upper beveled surface and a lower beveled surface. The lower beveled wall is formed between the rear wall and the lower wall. The upper beveled wall is formed between the rear wall and the upper wall.

The key point of the present invention is that the V shaped slots or grooves formed on the housing inside surface retain screws to hold the box laterally against a stud to prevent motion in the forward and backward direction which keeps the box from coining out. A connector can be used to hold flex or MC style wiring. A flange outside the box retains the box.

By providing a large flange, the installer can cut the hole slightly larger and the flange will have enough face to hold the box securely to the front of the wall. The V-shaped inside grooves keep the wood screws from sliding out of place. Access for a conduit or sheathed wire connection such as to a ½" diameter conduit connection or a sheathed wire connection provides a connection for connecting insulated wire to a standard plastic electrical box by connection to a ½" inside diameter conduit.

Preferably, the boxes are 2" wide 2¾" deep with the ceiling boxes being 3⅛" high while the wall boxes are 2⅞" high.

Figure 8:
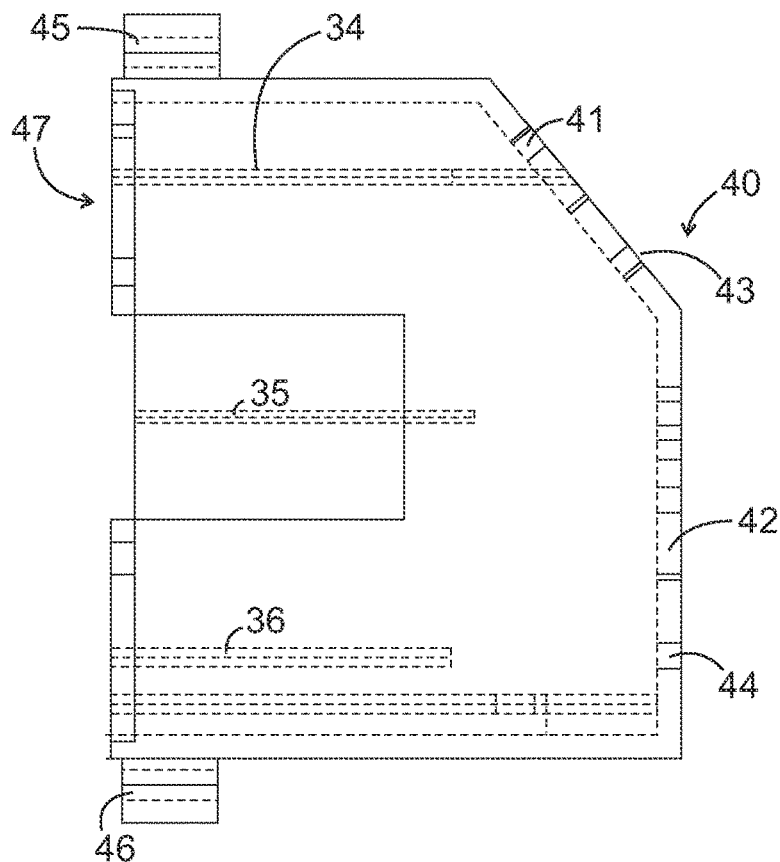
FIG. 8 is a side view of the ceiling mounted electrical box.
Figure 9:
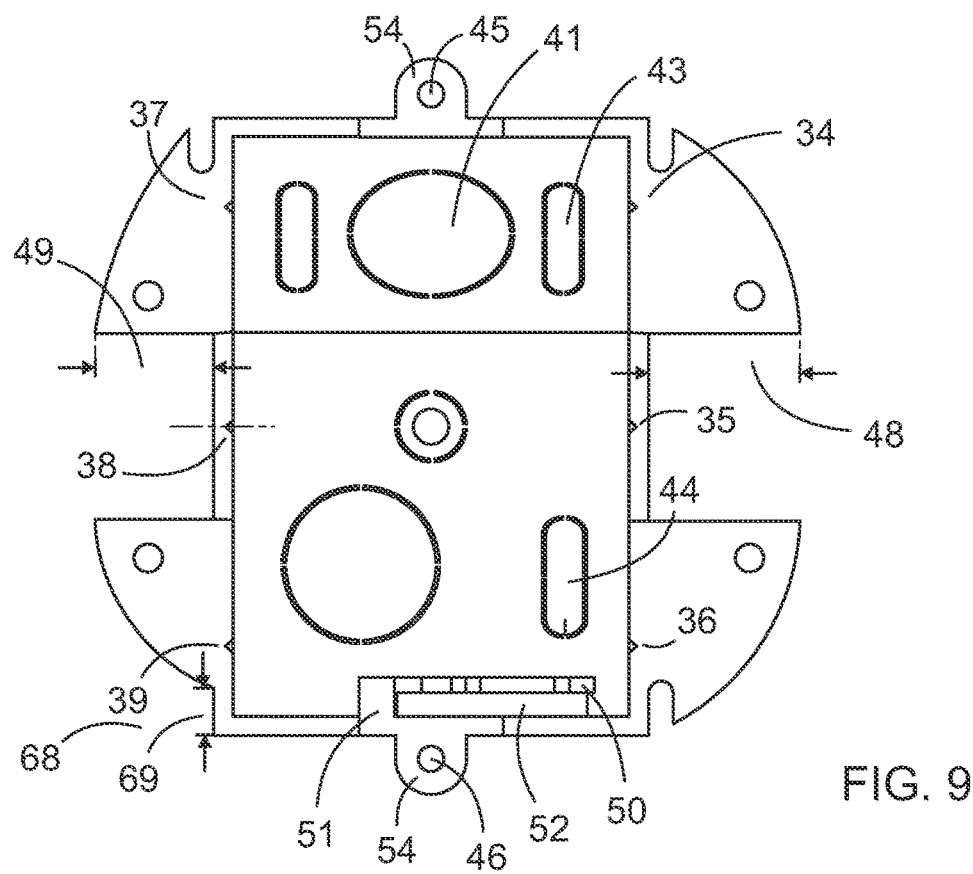
FIG. 9 is a front view of a ceiling mounted electrical box.
Figure 10:
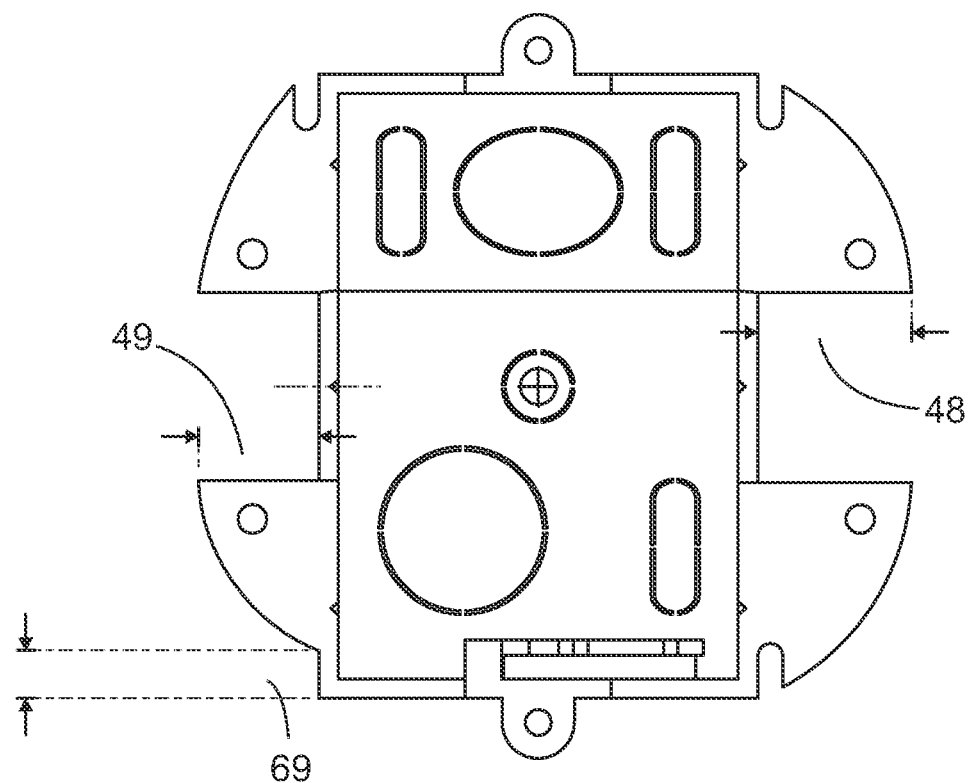
FIG. 10 is a front view of the ceiling mounted electrical box of FIG. 9.
Figure 11:
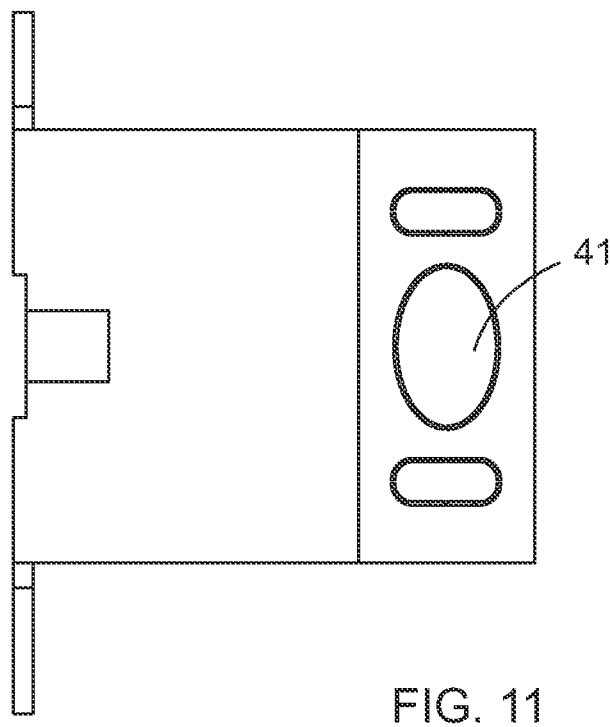
FIG. 11 is a side view of the ceiling mounted electrical box of FIG. 9.
Figure 12:
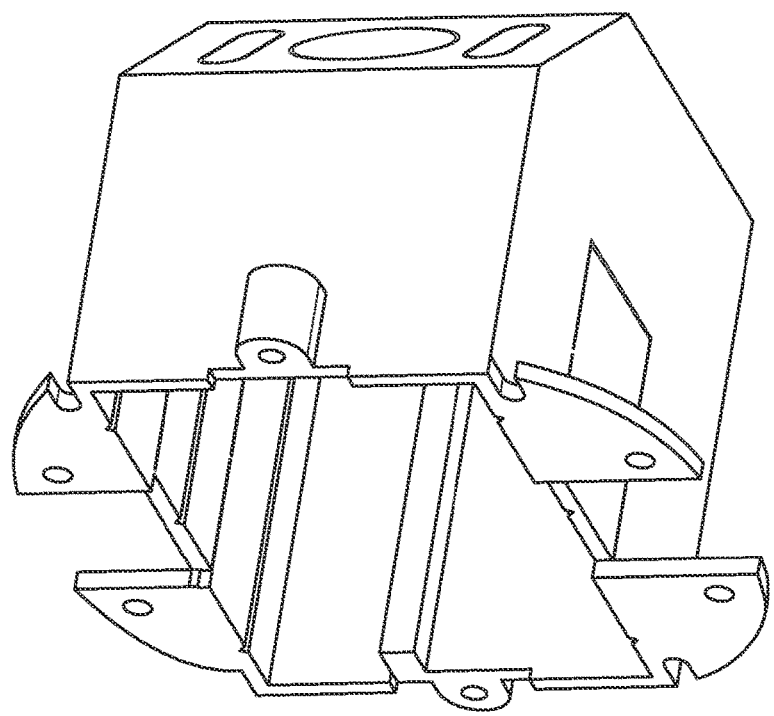
FIG. 12 is a perspective view of the ceiling mounted electrical box of FIG. 9.

As seen in FIGS. 8-9, the actual housing has a first V-shaped groove 34, a second V-shaped groove 35, and a third V-shaped 36 on a right side of the housing. On the left side of the housing, the housing has a fourth V-shaped groove 37, a fifth V-shaped groove 38, and a sixth V-shaped groove 39. The V-shaped grooves receive a tip of a screw because the angle of the V-shaped groove is less than 90°. The V-shaped grooves allow a screw to mount to a wall without walking or slipping. A pair of upper V-shaped grooves are located at an offset from the top wall of the housing, and a pair of lower V-shaped groups are located at an offset from the lower wall of the housing. A pair of middle V-shaped grooves are located at a midpoint of the sidewalls. The V-shaped grooves extend from a front opening 47 toward the rear, but preferably terminate before reaching the rear of the housing.

The rear panel 40 has a first rear panel circular knock out 41, and a second rear panel circular knock out 42 below the first rear panel circular knock out. The rear panel 40 also has a first rear panel romex knockout 43 and a second rear panel romex knockout 44 below the first rear panel romex knockout 43. Romex is a generic name for an electrical wiring harness having a hot, neutral and ground insulated in a plastic sheath.

The electrical housing has a first fixture mounting hole 45 mounted at a top side wall of the housing above the front opening 47, and a second fixture mounting hole 46 mounted at a lower side wall of the housing below the front opening 47. The first fixture mounting hole 45 and the second fixture mounting hole are both formed on fixture mounting flanges 54.

The right mounting flanges are wider and have a wide flange width of approximately 0.90 inches. The left mounting flanges are narrower and have a narrow flange width of approximately 0.73 inches. The lower left mounting flange has a third mounting flange offset 68 in the magnitude of a flange offset 69 that is the height of the bracket retainer slot 52.

The lower wall of the housing has a bracket retainer 50 that receives an external bracket not shown. The bracket retainer 50 has a bracket retainer left edge support 51 and a bracket retainer slot 52 which receives the external bracket.

Figure 13:
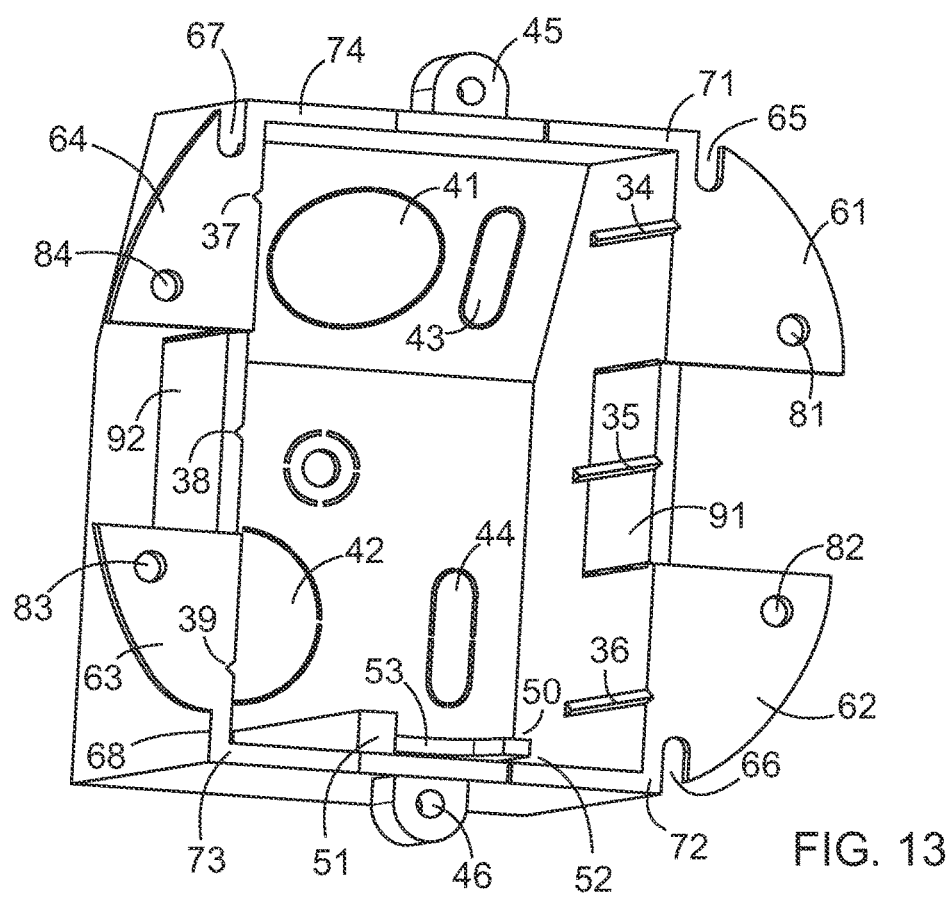
FIG. 13 is a perspective view of the ceiling mounted electrical box of FIG. 9.

As seen in FIG. 13, the mounting flange 25 include a first mounting flange 61 having a first tracing cut out 65 at a first housing corner 71, a second mounting flange 62 having a second tracing cut out 66 at a second housing corner 72, a third mounting flange 63 and a third housing corner 73, and a fourth mounting flange 64 having a fourth tracing cut out 67 at a fourth housing corner 74. The third mounting flange 63 optionally has a third mounting flange offset 68 as seen in FIGS. 9 and 13 instead of a third tracing cut out as seen in FIG. 2. The first mounting flange 61 has a first mounting flange hole 81. The second mounting flange 62 has a second mounting flange hole 82. The third mounting flange 63 has a third mounting flange hole 83. The fourth mounting flange 64 has a fourth mounting flange hole 84.

The first channel cut out 91 overlaps the second V-shaped groove 35, and the second channel cut out 92 overlaps the fifth V-shaped groove 38. The second V-shaped groove 35 extends slightly beyond the first channel cut out 91. The fifth V-shaped groove 38 extends slightly beyond the second channel cut out 92.

The bracket retainer hook 53 is formed on the bracket retainer 50 on a lower side wall of the housing.

Figure 14:
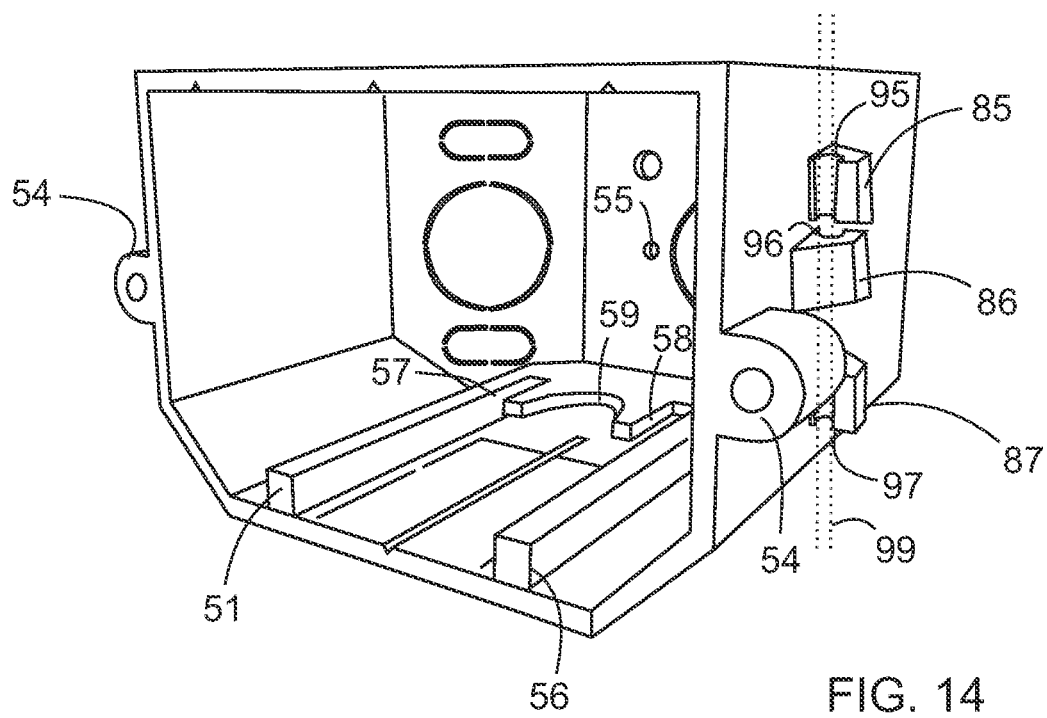
FIG. 14 is a perspective view of an electrical box.

As seen in FIG. 14, the bracket retainer also optionally includes a bracket retainer right edge support 56. The bracket retainer hook indent 59 can be formed between the bracket retainer hook right slot 58 and the bracket retainer hook left slot 57. The bracket retainer thus forms a slot for retaining an external stabilizing bracket. A 6-32 screw hole 55 having a standard 6-32 size can be formed on the rear wall.

Similarly, a mounting rod support can be formed on a side of the housing. A first rod support 85 cooperating with a second rod support 86 cooperating with a third rod support 87 can extend from a right side of the housing. The first rod support 85 may have a first rod support slot 95. The second rod support slot 96 can be formed on the second rod support 86, and the third rod support 87 can have a third rod support slot 97. The rod supports can be formed as protrusions on a side of the housing and the protrusions may have rod support slots for receiving an external rod. The external rod 99 can provide external connection to other structures.

Figure 15:
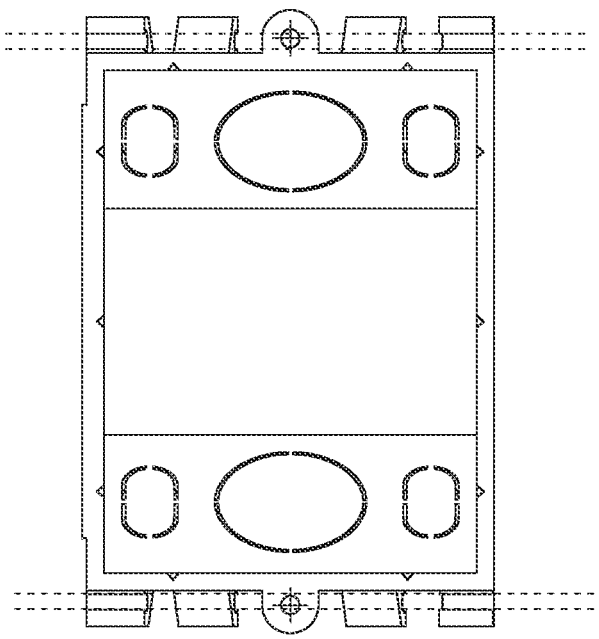
FIG. 15 is a front view of the electrical box of FIG. 14.
Figure 16:
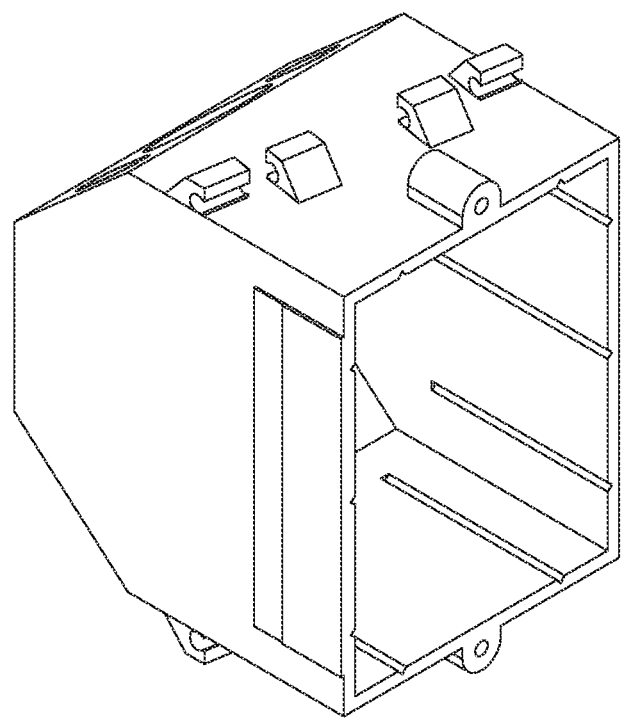
FIG. 16 is a perspective view of an electrical box of FIG. 14.

FIG. 15 shows that the first rod support, second rod support, and third rod support can be mounted on the top and the bottom walls of the electrical housing. FIG. 16 shows another perspective view of the rod supports. The rod supports are placed at an angle so that the rod passing through the rod supports is angled.

The invention claimed is:

1. An electrical installation housing comprising:
   a. top wall, a left side wall, the right side wall, a bottom wall, a rear wall, and a rear beveled wall
   b. a first mounting flange extending from the right side wall, wherein the first mounting flange includes a first mounting flange hole; a second mounting flange extending from the right side wall, wherein the second mounting flange includes a second mounting flange hole; a third mounting flange extending from the left side wall, wherein the third mounting flange includes a third mounting flange hole, a fourth mounting flange extending from the left side wall, wherein the fourth mounting flange includes a fourth mounting flange hole; and a V-shaped slot formed on either right side wall or the left side wall; and c. a supplemental bracket holder, wherein the supplemental bracket holder is formed as a bracket retainer having a bracket retainer left edge and a bracket retainer right edge defining a slot between the bracket retainer left edge and the bracket retainer right edge.

2. The electrical installation housing of claim 1, further including a bracket retainer hook formed on the bracket retainer.

3. An electrical installation housing comprising:
a. top wall, a left side wall, the right side wall, a bottom wall, a rear wall, and a rear beveled wall
b. a first mounting flange extending from the right side wall, wherein the first mounting flange includes a first mounting flange hole; a second mounting flange extending from the right side wall, wherein the second mounting flange includes a second mounting flange hole; a third mounting flange extending from the left side wall, wherein the third mounting flange includes a third mounting flange hole, a fourth mounting flange extending from the left side wall, wherein the fourth mounting flange includes a fourth mounting flange hole; and a V-shaped slot formed on either right side wall or the left side wall,
c. wherein the third mounting flange has a third mounting flange offset.

4. An electrical installation housing comprising:
a. top wall, a left side wall, the right side wall, a bottom wall, a rear wall, and a rear beveled wall
b. a first mounting flange extending from the right side wall, wherein the first mounting flange includes a first mounting flange hole; a second mounting flange extending from the right side wall, wherein the second mounting flange includes a second mounting flange hole; a third mounting flange extending from the left side wall, wherein the third mounting flange includes a third mounting flange hole, a fourth mounting flange extending from the left side wall, wherein the fourth mounting flange includes a fourth mounting flange hole; and a V-shaped slot formed on either right side wall or the left side wall,
c. wherein the third mounting flange and the fourth mounting flange have a narrow flange width of a smaller dimension than a wide flange width of the first mounting flange and the second mounting flange.

5. An electrical installation housing comprising:
a. top wall, a left side wall, the right side wall, a bottom wall, a rear wall, and a rear beveled wall
b. a first mounting flange extending from the right side wall, wherein the first mounting flange includes a first mounting flange hole; a second mounting flange extending from the right side wall, wherein the second mounting flange includes a second mounting flange hole; a third mounting flange extending from the left side wall, wherein the third mounting flange includes a third mounting flange hole, a fourth mounting flange extending from the left side wall, wherein the fourth mounting flange includes a fourth mounting flange hole;
c. a first V-shaped slot and is formed on the right side wall;
d. a second V-shaped slot is formed on the right side wall;
e. a third V-shaped slot is formed on the right side wall;
f. a fourth V-shaped slot formed on the left side wall;
g. a fifth V-shaped slot formed on the left side wall;
h. a sixth V-shaped slot formed on the left side wall;
i. a first romex knockout on the rear beveled wall and a second romex knockout on the rear wall;
j. a first fixture mounting hole formed at a top wall fixture mount and a second fixture mounting hole formed at a bottom wall fixture mount;
k. a supplemental bracket holder, wherein the supplemental bracket holder is formed as a bracket retainer having a bracket retainer left edge and a bracket retainer right edge defining a slot between the bracket retainer left edge and the bracket retainer right edge; and
l. a bracket retainer hook formed on the bracket retainer.

6. The electrical installation housing of claim 5, further including a first channel cut out formed on the right side wall, and further including a second channel cut out formed on the left side wall, wherein the first channel cut out overlaps the second V-shaped slot, and wherein the second channel cut out overlaps the fifth V-shaped slot.

7. The electrical installation housing of claim 5, further including a first circular knockout formed on the rear beveled wall next to the first romex knockout, and further including a second circular knockout formed on the rear wall next to the second romex knockout.

8. The electrical installation housing of claim 5, wherein the third mounting flange has a third mounting flange offset.

9. The electrical installation housing of claim 5, wherein the third mounting flange and the fourth mounting flange have a narrow flange width of a smaller dimension than a wide flange width of the first mounting flange and the second mounting flange.

* * * * *